United States Patent [19]

Simpson

[11] 4,243,768

[45] Jan. 6, 1981

[54] SAG-RESISTANT COMPOSITIONS

[75] Inventor: Jon H. Simpson, St. Paul, Minn.

[73] Assignee: Minnesota Mining and Manufacturing Company, St. Paul, Minn.

[21] Appl. No.: 783,350

[22] Filed: Mar. 31, 1977

[51] Int. Cl.$^3$ .................. C08L 75/04; C08L 35/02
[52] U.S. Cl. .................. 525/127; 156/331; 521/174; 525/55; 525/100; 525/118; 525/123; 525/130; 525/226; 525/455; 526/328
[58] Field of Search .................. 260/859 R, 77.5 CR, 260/837 R; 252/182; 525/123, 130, 127, 6, 455; 156/331; 526/328

[56] References Cited

U.S. PATENT DOCUMENTS

| | | | |
|---|---|---|---|
| 3,622,534 | 11/1971 | Timmons et al. | 252/316 |
| 3,663,467 | 5/1972 | Albright | 260/2.5 B |
| 3,951,898 | 4/1976 | Paul | 260/29.6 NR |
| 4,025,407 | 5/1977 | Chang et al. | 204/159.14 |
| 4,107,288 | 8/1978 | Oppenheim | 252/316 |

FOREIGN PATENT DOCUMENTS

| | | |
|---|---|---|
| 674969 | 7/1952 | United Kingdom . |
| 801399 | 9/1958 | United Kingdom . |
| 1263873 | 2/1972 | United Kingdom . |

*Primary Examiner*—Theodore E. Pertilla
*Attorney, Agent, or Firm*—Cruzan Alexander; Donald M. Sell; Dean P. Edmundson

[57] ABSTRACT

Sag-resistant, pumpable compositions are described which comprise a liquid material dispersed throughout a crosslinked polymer matrix. The liquid material may be a polymerizable material or a polymer-containing material. The compositions of the invention have very broad utility, depending upon the particular ingredients present.

8 Claims, No Drawings

SAG-RESISTANT COMPOSITIONS

BACKGROUND OF THE INVENTION

This invention relates to flow control of liquid compositions.

In many applications for adhesives it is necessary, or highly desirable, to place the adhesive on a vertical or inclined surface prior to bonding another material to such surface. Similarly, when using various types of sealants, it is necessary to place the sealant on a vertical or inclined surface. There are many instances of this in building construction and manufacturing operations. However, when placing liquid adhesives, or sealants, on vertical or inclined surfaces, the adhesives either flow off or sag considerably before a material can be bonded to the surface by means of the adhesive, and liquid sealants tend to flow off or sag considerably before they become cured.

Although there are adhesives and sealants available which are not in liquid form, the liquid adhesives and sealants are generally preferred for many applications because they wet out the surfaces of the materials to which they are to be adhered, thereby promoting very good adhesion.

Various techniques have been used previously in order to thicken liquid materials or to suspend particulate matter such as fillers. For example, a common technique involves addition of small particle inert fillers (such as clay, talc, fumed silica, asbestos and the like) in order to thicken or body a liquid composition (such as an adhesive or sealant). The use of such fillers relies upon particle-particle interaction. There are many inherent disadvantages associated with the use of such fillers.

Although such fillers do impart thixotropy to a liquid composition, the viscosity of the composition often does not increase rapidly after shearing forces are removed. Furthermore, the fillers must be intimately mixed or compounded with the other ingredients in the composition and this requires use of a significant amount of energy. It is also possible to under-mix or over-mix such compositions; accordingly, the degree of mixing must be carefully controlled.

Moreover, such fillers may be leached out of the composition, or break down, on exposure of the composition to the environment during use. Also, some of such fillers have only specific application, i.e. not all of such fillers are useful in all types of compositions. Additionally, the effectiveness of some fillers may be negatively affected by the presence of other ingredients. Furthermore, it is often difficult to obtain the proper color desired for the ultimate composition, and it is extremely difficult, if not impossible, to obtain clear compositions having the desired properties. Fibrous fillers (such as asbestos) also tend to impart a grainly consistency to a composition, and the use of some of such fibrous fillers constitutes a serious health hazard.

Another type of additive which is often used to thicken materials such as oils and greases is a metal soap (i.e. a metallic salt.) However, such soaps may be reactive with many types of curable compositions and accordingly such soaps would tend to interfere with the curing of the composition and would therefore detract from the cured properties of the composition. Furthermore, the compositions which are bodied with such soaps are quite shear sensitive.

Another type of material which has been promoted as a thickener for liquid compositions is that commercially available from NL Industries under the "Thixcin" series. Such materials have pendent hydroxyl groups and accordingly rely upon the effects of hydrogen bonding to impart thickening characteristics. However, such materials do not operate efficiently in the presence of polar solvents. Furthermore, compositions containing such materials are very shear sensitive.

A specific technique for thickening comprising synthetic elastomer and elastomer solvent is described in U.S. Pat. No. 3,622,534. The technique described there involves the formation of urea (by reaction of an aliphatic amine with an isocyanate in the presence of the synthetic elastomer and elastomer solvent). However, no crosslinked polymer matrix is obtained. As explained in more detail hereinafter, the compositions of the present invention require the presence of a crosslinked polymer matrix.

SUMMARY OF THE INVENTION

In accordance with the present invention there is provided a sag-resistant, pumpable composition comprising a liquid material dispersed throughout a crosslinked polymer matrix, wherein the liquid material is selected from (a) liquid polymerizable materials, and (b) liquid polymer-containing materials.

The compositions of the invention are characterized by good handling properties. Preferably, the compositions have a generally buttery consistency, and the compositions are much less sensitive to shear and mixing than those which contain small particle fillers. Furthermore, by use of a crosslinked polymer matrix to impart controllable viscosity or body to a composition, it is possible to obtain clear products because no fillers are required. Also, the crosslinked polymer matrix is not affected by the polarity of the ingredients present in the composition (whereas high polarity of ingredients may render some conventional thickeners inefficient). Accordingly, the crosslinked polymer matrix may be used predictably to impart sag-resistance to a myriad of compositions.

Moreover, the crosslinked polymer matrix will not leach out of the compositions or be significantly affected by the environment in which the compositions are used.

The term "pumpable" as used herein means that the compositions of the invention may be caused to flow under some amount of pressure. Accordingly, the compositions may be handled with conventional pumping equipment during packaging operations or during use of the compositions (e.g the compositions may be packaged in caulking tubes, if desired, and expelled therefrom by the consumer). Yet, the compositions are also desirably sag-resistant, i.e. they exhibit good resistance to flow or sagging on a surface under the influence of gravity immediately after being pumped or caulked into place.

DETAILED DESCRIPTION OF THE INVENTION

The types of liquid materials which are rendered sag-resistant in accordance with the present invention are selected from liquid polymerizable materials and liquid polymer-containing materials.

Preferably, the liquid polymerizable materials are selected from isocyanate-terminated prepolymers, epoxide-containing materials, glycols, and silane-terminated materials. Typical of the useful isocyanate-terminated prepolymers are those having polyoxyalkylene backbones, polyepihalohydrin backbones, polythioether backbones, polysulfide backbones, polyester backbones both of the condensation and lactone type, and polyhydrocarbon backbones. Many of these prepolymers are commercially available, e.g. "Vorite" series, available from NL Industries, "MC-40", available from KJ Quinn, "Spenlite M22-40E", available from Spencer Kellogg. Alternatively, useful isocyanate-terminated prepolymers may be prepared according to common techniques which are well known in the art.

Isocyanate-terminated prepolymers are typically caused to polymerize to high molecular weight by exposing them to moisture (e.g. moisture in the air). Such prepolymers may also be caused to polymerize by mixing them with an active-hydrogen-containing material such as glycols, amines, carboxylic acids and the like.

Epoxide-containing materials which are useful in the present invention include diglycidyl ethers of bisphenol A, diglycidyl ethers of novolak resins, epoxidized polybutadiene, cycloaliphatic epoxides, and the like. Many of such epoxides are liquids, although the epoxides which are solid may also be used provided that they are dissolved in a suitable solvent.

Epoxide-containing materials are cause to polymerize by addition of well known curatives such as amine-containing materials, strong acids, and anhydrides. The curatives may be added as a separate material by the consumer at the time of use of the composition, or the curative may be present in the composition in latent form (i.e. the composition may be either "two-part" or "one-part").

Representative glycols which are useful in the present invention are those having polyoxyalkylene backbones, polyepihalohydrin backbones, polythioether backbones, polysulfide backbones, polyester backbones both of the condensation and lactone type, and polyhydrocarbon backbones. Representative glycols which are commercially available include "Niax Polyol PPG 1025" and "Niax Polyol LHT-240" from Union Carbide; "Polymeg 1000 and 2000" from Quaker Chemical Company; "Polycin 51" from NL Industries; and "Niax Polyol PCP-0210" from Union Carbide.

Glycols are polymerized by reaction with polyisocyanate, which is usually added to the composition at the time of use.

Silane-terminated polymerizable materials which are useful in the present invention include any material, organic or inorganic, which has at least two reactive silane groups thereon. Typical materials have backbones such as polysiloxane, polyoxyalkylene, polyepihalohydrin, polythioether, polysulfide, polyester (both of the condensation and lactone type), and polyhydrocarbon. One of such materials is prepared by reacting acyloxysilane with hydroxylated siloxanes. The other materials are prepared by first end-capping hydroxyl-substituted materials having the abovedescribed organic backbones using a polyisocyanate-containing material, as is well understood in the art. The resulting isocyanate-terminated material is then reacted with active-hydrogen-containing silane monomer, in a stoichiometric amount.

Silane-terminated materials as described herein are readily polymerized by exposure to moisture.

Preferably the liquid polymer-containing materials which are used in the present invention are selected from non-crosslinked acrylic polymers (in solvent solution), polyurethane resins (in solvent solution), rubber-resin solvent solutions, silicone oils and lubricating fluids. Typical of the acrylic polymers are polymethylmethacrylate, poly-n-butylmethacrylate, polyethylacrylate, poly-n-butylacrylate, and various copolymers thereof. Acrylic polymers are widely available in solid form and in solvent solution form. Typical commercially available acrylic polymers are the "Lucite" series available from E. I. duPont, and the "Acryloid" series available from Rohm and Haas. Each of these are available in solid and solvent solution form.

The polyurethanes which are useful may have any type of backbone, although those types of backbones described above with respect to isocyanate-terminated prepolymers are the most common backbones used herein. Typical commercially available polyurethane resins in solvent solution form are the "Rucothane" series available from Hooker Chemical, and "Permuthane" series available from Beatrice Chemical Division of Beatrice Foods, and others which are well known. Typical commercially available solid resins, which may be dissolved in solvents such as ketones, acetates, aromatics, dimethylformamide, tetrahydrofuran, and the like, include the "Estane" series available from B. F. Goodrich Chemical, and other well known materials.

Typical rubber-resin solutions which are useful are natural and synthetic rubbers dissolved in common solvents (such as hydrocarbons, aromatics, ketones, chlorinated esters and the like) along with natural and synthetic tackifying or reinforcing resins which are well known in the art.

Typical silicone oils which are useful are those which are promoted for use as high performance lubricating oils. These materials typically have a siloxane backbone and are relatively inert. Typical commercially available silicone oils are the "SWS" series available from Stauffer Wacker.

Typical lubricating fluids which may be used are the commonly available hydrocarbon, paraffinic, naphthenic or aromatic lubricating oils. Such materials are very well known in the art and are commercially available from a wide variety of companies in the petroleum industry.

When the liquid materials are dispersed throughout the crosslinked polymer matrix a sag-resistant, pumpable composition is obtained. Preferably the crosslinked polymer matrix is formed in the presence of the liquid materials (i.e. in situ), although it is also possible to form the crosslinked polymer matrix in a solvent, followed by addition of the liquid material thereto with heating and stirring.

The crosslinked polymer matrix may be formed from various monomers. Preferred monomers are those which are polymerizable by a free-radical mechanism, although other types of monomers may also be used. Preferred free-radically-polymerizable monomers include polyfunctional acrylic monomers (such as polyfunctional acrylates, methacrylates, and substituted acrylates and methacrylates), divinyl aromatic monomers (such as divinyl benzene and divinyl toluene), polyfunctional acrylamides) such as N,N'-methylenebisacrylamide), polyfunctional allylic monomers (such as triallylcyanurate, triallylisocyanurate, and triallylphosphite), and mixtures thereof. Other free-radically-polymerizable monomers may also be added, such as styrene, ethylacrylate and -methacrylate, butylacrylate and -methacrylate, 2-ethylhexylacrylate and -methacrylate, isooctyl-acrylate and -methacrylate, and the like.

Preferably, the crosslinked polymer matrix is derived from polyfunctional acrylate or methacrylate monomers. Representative of these monomers are:
trimethylolpropane triacrylate and trimethacrylate
1,4-butanediol diacrylate and dimethacrylate
diethyleneglycol diacrylate and dimethacrylate
pentaerythritol tetracrylate and tetramethacrylate
1,6-hexanediol diacrylate and dimethacrylate
and other well known polyfunctional acrylates and methacrylates.

Typically the polyfunctional monomer is added to the liquid material and then polymerized in situ to form a crosslinked polymer matrix. Generally speaking, the amount of polyfunctional monomer to be used may vary over a broad range depending upon the initial viscosity of the liquid material and the degree of sag-resistance desired in the final composition. Generally, the amount of monomer added is in the range of 0.5% to 20% by weight of the composition. Preferably, sufficient monomer is added such that after the crosslinked polymer matrix is formed the composition has increased viscosity and exhibits the desired degree of sag resistance.

When using free-radically-polymerizable monomers, a small amount of free-radical-generating catalyst or initiator is added to the liquid material, along with the monomer, after which the blended mixture is typically heated at elevated temperature for a time sufficient to obtain substantial polymerization of the monomer to form the crosslinked matrix. Generally speaking, the amount of catalyst or initiator added is in the range of about 0.25% to 5% based on the weight of the monomer.

Typical of the useful free-radical generating catalysts are azo-type catalysts, peroxides, hydroperoxides, redox-type catalysts, and photoinitiators. Representative useful catalysts include 2,2'-azobisisobutyronitrile, 2,2'-azobis-2-methylpropionitrile, benzoyl peroxide, dicumylperoxide, methylethylketone peroxide, cumene hydroperoxide, benzoin methylether, benzoin ethylether, photolyzable organic halogen compounds described in U.S. Pat. No. 3,617,288, and other catalysts well known in the art.

The compositions of the invention may also include, if desired, antioxidants, U.V. stabilizers, inert extenders, pigments or dyes, wetting agents, adhesion promoters, plasticizers, curatives, and other common additives.

The compositions of the invention have very wide utility. For example, the compositions may be used as adhesives, sealants, or coatings depending upon the particular type of polymerizable material (or polymer-containing material) present therein. An additional advantage derived from the present invention is that it is possible to prepare compositions which produce clear products by selecting a crosslinked polymer matrix which has an index of refraction which substantially matches that of the polymer derived from the liquid polymerizable material or the polymer-containing material.

The invention is further illustrated by means of the following non-limiting examples in which the term "parts" refers to parts by weight unless otherwise indicated.

EXAMPLE 1

An isocyanate-terminated prepolymer is prepared by the addition of one equivalent (984 grams) of polypropylene glycol ("PPG 2025", commercially available from Union Carbide) to two equivalents (174 grams) of toluene diisocyanate, followed by heating for a period of four hours at 80° C. A dry nitrogen purge is maintained during the entire reaction period to prevent reaction of the isocyanate moieties with water. The resulting prepolymer product is permitted to cool to room temperature. The viscosity of the prepolymer is measured and found to be 6800 centipoise at 25° C.

To the above prepolymer is added 57.9 grams of trimethylolpropanetrimethacrylate and 0.58 grams of 2,2'-azobisisobutyronitrile. The ingredients are blended together using moderate agitation, under constant nitrogen purging to minimize the amount of moisture and oxygen present, and the blended ingredients are heated at 90° C. for one hour. Under such conditions the acrylate monomer is polymerized in the presence of the prepolymer to form a crosslinked polymer matrix. The resulting product, after being cooled to room temperature, has a viscosity of 995,000 centipoise and is pumpable. When packaged in an air-tight container the product has prolonged stability.

The product exhibits no sag when semi-circular beads of the product having a one-fourth inch (6.4 mm.) radius are disposed on a nearly vertical panel (5° from vertical).

The product is an excellent adhesive and cures readily when exposed to the atmosphere.

EXAMPLE 2

The isocyanate-terminated prepolymer of Example 1 is blended with 57.9 grams of 1,6-hexanedioldiacrylate and 0.58 gram of 2,2'-azobisisobutyronitrile. The ingredients are blended together using moderate agitation, under constant nitrogen purging, and the blended ingredients are heated at 90° C. for one hour. Under such conditions the acrylate monomer is polymerized in the presence of the prepolymer to form a crosslinked polymer matrix. The resulting product, after being cooled to room temperature, has a viscosity of 40,000 cps. and is pumpable. When packaged in an air-tight container the product has prolonged stability.

The product exhibits no sag when semi-circular beads of the product having a one-eighth inch (3.2 mm.) radius are disposed on a nearly vertical panel (5° from vertical).

The product is an excellent adhesive and cures readily when exposed to the atmosphere.

EXAMPLE 3

A sag-resistant, pumpable composition is prepared using the procedure of Example 1 except that 57.9 grams of diethyleneglycoldiacrylate is substituted for the trimethylolpropanetrimethacrylate. The resulting product has a viscosity of 187,500 cps. The product has prolonged stability in air-tight containers.

The product is an excellent adhesive and cures readily when exposed to the atmosphere.

EXAMPLE 4

A sag-resistant, pumpable composition is prepared using the procedure of Example 1 except that the polypropylene glycol is replaced with one equivalent weight of a glycol derived from ricinoleic acid in the preparation of the isocyanate-terminated prepolymer.

After in situ formation of the crosslinked acrylate polymer, as described in Example 1, the resulting composition exhibits a viscosity of 160,000 cps. The product exhibits minimal sag when semi-circular beads of the product having a one-fourth inch (6.4 mm.) radius are disposed on a nearly vertical panel (5° from vertical).

The product is an excellent moisture-curable adhesive.

EXAMPLE 5

A sag-resistant, pumpable composition is prepared using the following ingredients in the amounts stated:

| Ingredient | Parts |
| --- | --- |
| Epoxy resin (epoxy equivalent weight 185–200; "Epon 828", commercially available from Shell Chemical Company) | 700 |
| Trimethylolpropanetrimethacrylate | 35 |
| 2,2'-Azobisisobutyronitrile | 0.35 |

The above ingredients are blended together, with moderate agitation, for one hour at 90° C. whereby the acrylate monomer is polymerized to form a crosslinked polymer matrix. After cooling the resulting composition to 77° F. it exhibits a viscosity of 13,000 cps. The composition exhibits good shelf stability and is sag-resistant. A three inch (7.6 cm.) wide coating up to about ten mils (0.25 mm.) thick does not flow when deposited on a nearly vertical surface (5° from vertical).

The composition is readily cured by addition thereto of amine-functional thermoplastic polyamide resin ("Versamid", available from General Mills, Inc.).

EXAMPLE 6

To 107.6 grams of an acetoxysilane-terminated silicone prepolymer in 99.4 grams of toluene are added, with stirring, 5.4 grams of trimethylolpropanetrimethacrylate and 0.5 gram of 2,2'-azobisisobutyronitrile. The blend is heated at 90° C. for one hour. A dry nitrogen purge is maintained during the reaction period. Under such conditions the acrylate monomer is polymerized in situ to form a crosslinked polymer matrix.

The resulting sag-resistant, pumpable product has a viscosity of 28,500 centipoise. When packaged in airtight containers the product has prolonged stability.

The product exhibits no sag when semi-circular beads of the product having a 3/16 inch (4.8 mm.) radius are disposed on a nearly vertical panel (5° from vertical).

The product is a good sealant and cures when exposed to moisture (e.g. from the air).

EXAMPLE 7

Four hundred grams of poly-n-butylmethyacrylate ("Lucite 2044", commercially available from E. I. duPont) are dissolved in 400 grams of toluene. To this polymer-containing solution are added, with stirring, 20 grams of trimethylolpropane trimethacrylate and 0.2 grams of 2,2'-azobisisobutyronitrile. The blend is heated at 90° C. for one hour.

The resulting composition has a viscosity of 350,000 centipoise and is pumpable.

The composition exhibits no sag when semi-circular beads of the composition having a 3/16 inch (4.8 mm.) radius are disposed on a nearly vertical panel (5° from vertical).

The composition, upon drying to remove solvent, produces a translucent sealant or coating.

EXAMPLE 8

Six hundred sixty (660) grams of polyisobutylene ("Vistanex LMMS", commercially available from Exxon Corp.) and 330 grams of polyterpene resin ("Piccolyte S-100", commercially available from Hercules, Inc.) are dissolved in 660 grams of toluene. To this rubber-resin solution is added, with stirring, 49.5 grams of trimethylolpropane trimethacrylate and 0.5 gram of 2,2'-azobisisobutyronitrile. The blend is heated at 90° C. for one hour with agitation.

The resulting composition, after cooling, has a viscosity of 126,000 centipoise and is pumpable.

The composition exhibits no sag when semi-circular beads thereof having a ¼ inch (6.4 mm.) radius are disposed on a nearly vertical surface (5° from vertical).

The composition, upon drying to remove solvent, has utility as an adhesive or sealant.

EXAMPLE 9

To 300 grams of a conventional non-reactive silicone-based polymeric oil ("SWS 101"; viscosity of 100 stokes; commercially available from Stauffer Wacker) are added 15 grams of trimethylolpropane trimethacrylate and 0.15 gram of 2,2'-azobisisobutyronitrile. The blend is heated for one hour at 90° C. with stirring.

The resulting composition has a viscosity of 200,000 centipoise and is pumpable.

The composition exhibits no sag when semi-circular beads thereof having a radius of ⅛ inch (3.2 mm.) are disposed on a nearly vertical panel (5° from vertical).

The composition is useful as a high viscosity grease.

EXAMPLE 10

Forty-five grams of trimethylolpropane trimethacrylate and 0.45 gram of 2,2'-azobisisobutyronitrile are added to 1390.8 grams of toluene. The blend is heated at 90° C. for three hours using moderate agitation. A gel (viscosity of approximately 1000 centipoise) having good non-sag characteristics is obtained.

478.8 grams of the above gelled composition is added to 250 grams of a isocyanate-terminated prepolymer ("Desmodur E-21", commercially available from Mobay) and 150 grams of a toluene diisocyanate-terminated prepolymer ("Desmodur E-14", commercially available from Mobay). The blend is agitated by means of an air stirrer rotating at about 250 rpm.

Excess solvent (toluene) is removed from the blend using vacuum stripping until a non-volatile content of 83% by weight is obtained.

The resulting composition has a viscosity of 17,000 centipoise and is pumpable. The composition exhibits no sag when semi-circular beads thereof having a ⅛ inch radius are disposed on a nearly vertical surface (5° from vertical).

The composition has utility as a moisture-curable adhesive.

EXAMPLE 11

Five hundred grams of a polyoxypropylene glycol ("PPG 1025", commercially available from Union Carbide Corp.) are added to 25 grams of trimethylolpropane trimethacrylate and 0.25 grams of 2,2'-azobisisobutyronitrile. The blend is heated at 90° C. for one hour under moderate agitation.

The resulting composition has a viscosity of 70,000 centipoise and is pumpable. The composition exhibits no sag when semi-circular beads thereof having a radius of ⅛ inch are disposed on a nearly vertical surface.

Upon mixing of this composition with polyisocyanate and a Freon blowing agent, it is possible to spray the composition on a vertical surface (to obtain an expanded foam) without sagging or running.

EXAMPLE 12

To 910 grams of the isocyanate-terminated prepolymer prepared as in Example 1 are added 91 grams of divinylbenzene and 0.91 gram of 2,2′-azobisisobutyronitrile. The blend is heated for one hour at 90° C. under a constant dry nitrogen purge and with agitation.

The resulting composition has a viscosity of over 1,000,000 centipoise and is a waxy solid but yet is pumpable.

The composition, which exhibits excellent sag-resistance, has utility as a moisture-curable sealant.

What is claimed is:

1. A sag-resistant, pumpable, curable composition comprising an isocyanate-terminated prepolymer dispersed throughout a synthetic, continuous, crosslinked polymer matrix.

2. A composition in accordance with claim 1, wherein said crosslinked polymer matrix is derived from trimethylolpropane trimethacrylate monomer.

3. A composition in accordance with claim 1, wherein said crosslinked polymer matrix is formed in situ.

4. A composition in accordance with claim 1, wherein said prepolymer has a polyoxyalkylene backbone.

5. A sag-resistant, pumpable composition comprising a liquid isocyanate-terminated prepolymer material dispersed throughout a continuous, crosslinked acrylic polymer matrix.

6. A method for rendering a liquid isocyanate-terminated prepolymer material sag-resistant comprising dispersing said prepolymer material throughout a continuous, crosslinked acrylic polymer matrix.

7. A composition according to claim 1, wherein said crosslinked polymer matrix is formed from free-radically-polymerizable monomer equivalent to 0.5 to 20% by weight of said composition.

8. A composition according to claim 1, wherein said crosslinked polymer matrix is formed from free-radically-polymerizable monomer equivalent to 0.5 to 10% by weight of said composition.

* * * * *

UNITED STATES PATENT AND TRADEMARK OFFICE
CERTIFICATE OF CORRECTION

PATENT NO. : 4,243,768
DATED : January 6, 1981
INVENTOR(S) : Jon H. Simpson

It is certified that error appears in the above—identified patent and that said Letters Patent is hereby corrected as shown below:

Column 1, line 57, replace "grainly" with --- grainy ---.

Column 2, line 52, replace "e.g" with --- e.g. ---.

Column 3, line 26, replace "cause" with --- caused ---.

Column 3, line 58, replace "abovede-" with --- above-de- ---.

Column 4, line 62, replace ")" with --- ( ---.

Column 4, line 67, replace "ethylacrylate" with

--- ethyl-acrylate ---.

Column 6, line 15, replace "grams" with --- gram ---.

Column 7, line 61, replace "grams" with --- gram ---.

Column 8, line 66, replace "grams" with --- gram ---.

Column 10, line 19, replace "free-radial-" with

--- free-radical- ---.

Signed and Sealed this

Seventh Day of April 1981

[SEAL]

Attest:

RENE D. TEGTMEYER

Attesting Officer   Acting Commissioner of Patents and Trademarks